Jan. 2 1968      D. H. SCHAEFER      3,361,985

SIGNAL DETECTION AND TRACKING APPARATUS

Filed Sept. 30, 1966      5 Sheets-Sheet 2

INVENTOR
David H. Schaefer

ATTORNEYS

INVENTOR
David H. Schaefer

BY

ATTORNEYS the frequency of the internally generated signal. These systems have the disadvantage of utilizing an analog approach which is less precise than a digital approach to signal control.

United States Patent Office

3,361,985
Patented Jan. 2, 1968

3,361,985
SIGNAL DETECTION AND TRACKING APPARATUS
David H. Schaefer, Silver Spring, Md., assignor to the United States of America as represented by the Administrator of the National Aeronautics and Space Administration
Filed Sept. 30, 1966, Ser. No. 584,066
13 Claims. (Cl. 331—17)

ABSTRACT OF THE DISCLOSURE

Digital approach to detecting an out of frequency condition between an internal signal and an external signal and the generation of digital signals to bring the internal signal into synchronism with the external signal.

---

The invention described herein was made by an employee of the United States Government and may be manufactured and used by or for the Government for governmental purposes without the payment of any royalties thereon or therefor.

This invention relates to frequency sensing and frequency correction systems and more particularly to a system for sensing signals and their frequency and to a system for synchronizing the signal frequency of a signal generator with the frequency of an external signal.

In many electronic systems it is necessary to sense signals and to synchronize the frequency of an internally generated signal with the frequency of an external signal. For example, in digital decoder systems it is necessary to generate a timing signal that is at the frequency of an incoming data signal. The generated timing signal may be utilized to control the shifting of shift registers, for example. Or, the timing signal can be used to provide sampling pulses for sampling the incoming data signal. In general, decoders process the data contained in the incoming signal so that it can be read out in an intelligible manner. That is, they process the signal so that the signal's data can be understood.

In other receiving systems it is necessary that a signal generator generate a signal at the frequency of an incoming signal so that the receiver can lock onto the incoming signal. One such system is the well-known phase locked loop receiver. That system requires the internal generation of a synchronizing signal to synchronize the system with the incoming data signal.

The foregoing paragraphs have described two systems wherein a synchronous timing signal is necessary, however, there are numerous other systems requiring synchronous timing signals. Hence, the invention is not limited to use in the foregoing systems.

The prior art has utilized numerous approaches for synchronizing an internally generated signal with a signal from an external source. Generally, these systems have comprised a means for searching the incoming signal to determine its frequency. After this has been determined a control means is utilized to maintain the internally generated signal at the frequency of the incoming signal. Hence, these systems require the use of a dual apparatus, one to search the incoming signal to determine its frequency and a second to maintain the internally generated signal at the incoming signal's frequency. These systems have the disadvantage that abrupt changes in incoming signal frequency will destroy their ability to internally generate the desired signal. Further, these systems are relatively complex, requiring numerous electronic systems and subsystems for their successful operation.

Another prior art approach has been to utilize an analog tracking system for detecting differences between the incoming signal and the internally generated signal and for varying the frequency of the internally generated signal to bring it into synchronism with the incoming signal. These systems have the disadvantage of utilizing an analog approach which is less precise than a digital approach to signal control.

Therefore, it is an object of this invention to provide a new and improved signal correction device.

It is also an object of this invention to provide a new and improved apparatus for maintaining the frequency of an internally generated signal in synchronism with the frequency of an externally generated signal.

It is a still further object of this invention to provide a new and improved apparatus for detecting when an internally generated signal is out of synchronism with an externally generated signal and for generating a pulse signal representing said out of synchronism condition.

It is a still further object of this invention to provide a new and improved frequency correction device for detecting when an internally generated signal is out of synchronism with an externally generated signal; for generating pulses representing whether the internally generated signal is greater or less than the externally generated signal; and for utilizing said pulses to control the internally generated signal to bring it into frequency synchronism with said externally generated signal.

Inherent in a device that can synchronize the frequency of an internally generated signal with the frequency of an external signal is the ability to sense the presence of the external signal. And, in some electronic environments it is desirable to be able to sense the presence or absence of a signal. For example, it is desirable to determine what line or lines of a plurality of lines possesses a signal.

Therefore, it is a still further object of this invention to provide a new and improved apparatus for sensing the presence or absence of a frequency varying signal.

In addition to the foregoing disadvantages, prior art systems have also suffered from the inability to detect the presence of and to synchronize with low level signals. That is, prior art devices have been unable to track signals that have voltage levels that are near the voltage level of noise.

Hence, it is also an object of this invention to provide a new and improved apparatus for sensing low level signals.

It is still another object of this invention to provide a new and improved apparatus for sensing low level signals and for synchronizing the frequency of an internally generated signal with the frequency of these low level signals.

In accordance with a principle of the invention an externally generated signal is sampled by a sampling system at a rate determined by the frequency of an internally generated signal to determine if the frequency of the internally generated signal is the same as the frequency of the externally generated signal. If the frequency of the internally generated signal is above the frequency of the externally generated signal the sampling system generates a pulse at one output. If the frequency of the internally generated signal is below the frequency of the externally generated signal then the sampling system generates a pulse at a second output. Hence, a system is provided for sampling an externally generated signal and utilizing it to generate pulses at one of two outputs. The output having the pulse is determined by the frequency relationship between the input signal and the external signal. The outputs from the sampling system are applied to the means for generating the internal signal. The inputs to the internal signal generating means from the sampling system are used to increase or decrease the frequency output of the internal signal generating means to bring it into synchronism with the frequency of the external signal.

In accordance with a still further principle of the invention the sampling system is divided into two sections; a primary sample section and a secondary sample section. The primary sample section samples the external signal once every half-cycle of the internally generated signal. If the internal and external signals are both at the same frequency, the primary section does not indicate an out of frequency condition. If the two signals are out of frequency the primary section generates a pulse output signal. While the primary sample determines whether there is an out of frequency condition, it does not determine whether the frequency is above or below the internally generated signal. The secondary section generates this information. The secondary section samples the signal at periods in between the primary samples and generates a pulse output that designates whether the internally generated signal is above or below the external signal in frequency. The outputs from the primary and secondary sampling sections are coupled together to generate pulses on "up" or "down" lines. These output lines are preferably connected to the internal signal generation means to increase or decrease its output signal frequency.

It will be appreciated that the foregoing is a simple means for generating error pulses. These pulses indicate when an internally generated signal is out of frequency with an externally generated signal. Further, these pulses may be utilized to control an internal signal generating means to increase or decrease the frequency of its output signal in order to bring it into synchronism with the externally generated signal.

In accordance with a still further principle of the invention the pulses applied on the up and down lines are applied to a pair of counters and to the set and reset sides of a flip-flop. The outputs from the flip-flop are connected to the reset inputs of the counters and the outputs from the counters are connected to inhibit the passage of pulses on the "up" and "down" lines until the counters are full. In this manner a simple means is provided for distinguishing a low level signal from noise. That is, a number of up or down pulses must be accumulated in the counters prior to pulse passage on the "up" and "down" lines. This accumulation will only occur for a signal not for noise because noise will continuously set and reset the flip-flop to reset the counters.

The foregoing objects and many of the attendant advantages of this invention will become more readily appreciated as the same becomes better understood by reference to the following detailed description when taken in conjunction with the accompanying drawings wherein.

Figure 1:
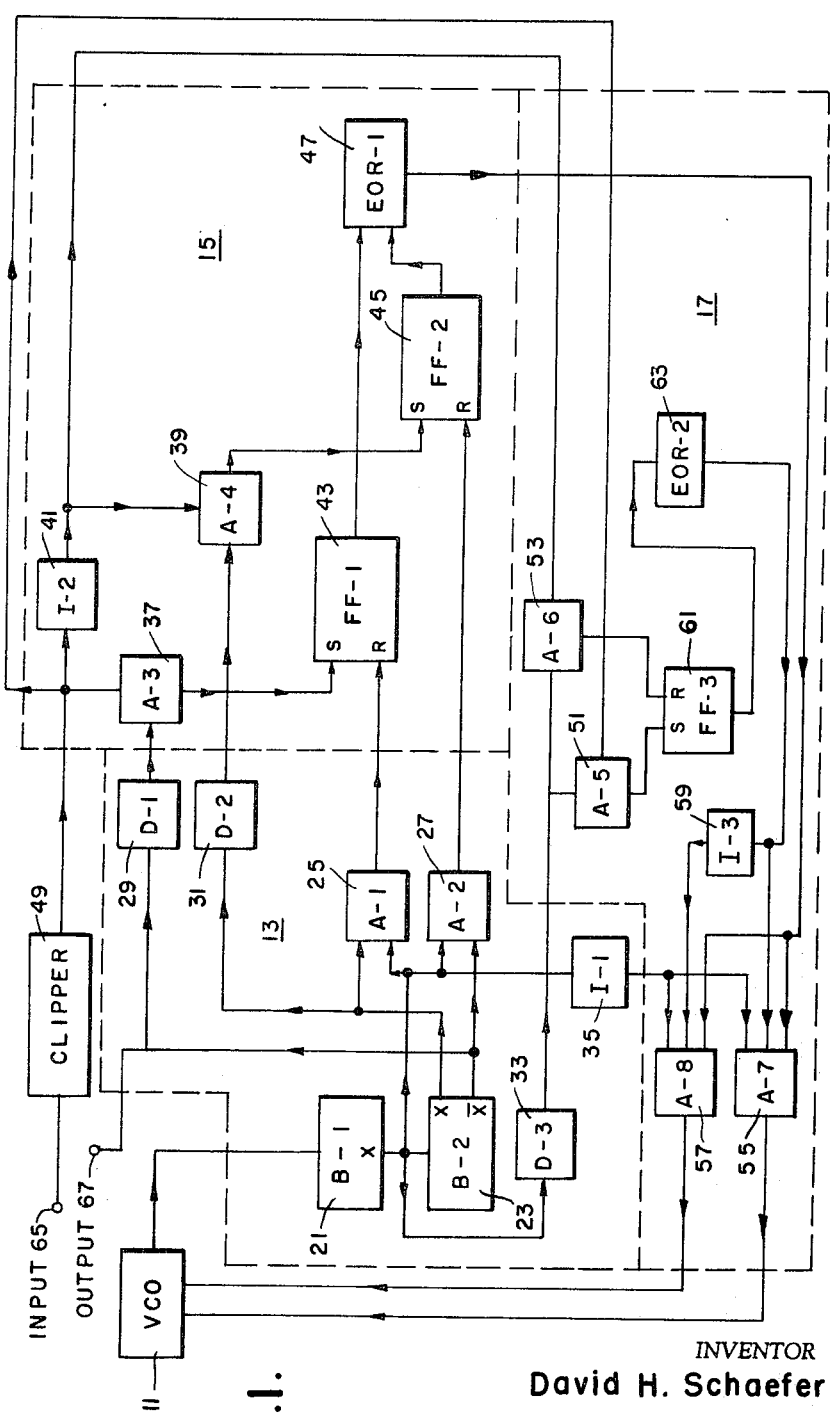
FIG. 1 is a block diagram of a preferred embodiment of the invention.

FIG. 1 is a block diagram illustrating one embodiment of the invention and comprises a voltage controlled oscillator 11, a timing section generally indicated at 13 within dashed lines at the upper left portion of the figure, a primary sampling section generally indicated at 15 within dashed lines to section 13's right, and a secondary sampling section generally indicated at 17 within dashed lines at the figure's lower portion.

The timing sampling section comprises a first binary counter stage 21, a secondary binary counter stage 23, a first two input AND gate 25, a second two input AND gate 27, a first differentiator 29, a second differentiator 31, a third differentiator 33, and a first inverter 35. For ease of understanding the first and second binary counter stages are illustrated as B–1 and B–2, respectively; the first and second AND gates are illustrated as A–1 and A–2, respectively; the first, second, and third differentiators are illustrated as D–1, D–2, and D–3, respectively; and the first inverter is illustrated as I–1. B–1 has only a true output whereas B–2 has both a true and a complementary output. The true outputs are designated as X and the complementary output is designated as $\overline{X}$. Further, B–1 and B–2 count down their input signals so that these outputs are at ½ the frequency of their inputs. Moreover, the differentiators only generate pulses for a rise in their input voltages not for a drop.

The VCO is adapted to generate signals at four times a particular desired frequency. This frequency quadrupling is necessary to provide timing pulses for operation of the primary and secondary sampling sections. The output from the VCO is connected to the input of B–1 which is a conventional binary network. The true output from B–1 is connected to one input of A–1, one input of A–2, the input of I–1, the input of D–3, and the input of B–2. The true output of B–2 is connected to the second input of A–1 and to the input of D–2. The complementary output of B–2 is connected to an output terminal 67, to the second input of A–2 and to the input of D–1.

Figure 2:
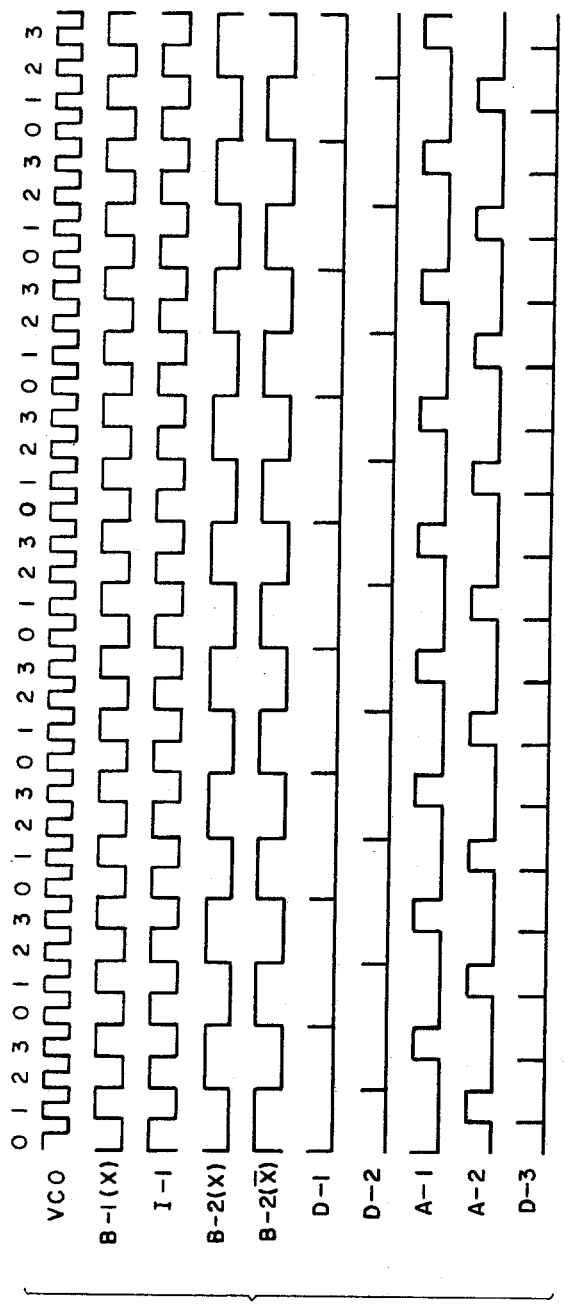
FIG. 2 is a timing diagram of the sampling pulses of the invention.

FIG. 2 is a timing diagram of the timing section 13; the diagram is broken into a series of four periodic intervals as viewed from left to right. These intervals are designated 0, 1, 2, and 3. The first line of FIG. 2 represents the output of the VCO and is a series of binary signals. A complete signal exists in each of the four intervals. The second line is designated as B–1(X) and represents the true output of B–1. This second line is also a binary signal, however, it is at one-half the frequency of the output from the VCO. Specifically, the line B–1(X) signal is at zero during the 0 and 2 intervals and is at a voltage condition during the 1 and 3 intervals.

The output from I–1 is the inversion of the output from B–1. Hence, the output from I–1 is at zero during the 1 and 3 intervals and is at a voltage condition during the 0 and 2 intervals.

The true output from B–2 is illustrated as B–2($x$) in FIG. 2 and the complementary output from B–2 is illustrated as B–2($\overline{x}$). Both of the B–2 outputs are one-half the frequency of the inputs to B–2 or at one-quarter of the frequency of the input to B–1. Hence, the outputs from B–2 are at the same frequency as the input signal when the output of the VCO is four times the frequency of the input signal.

The true output of B–2 or line B–2($x$) is at zero during the 0 and 1 intervals and is at a voltage condition during the 2 and 3 intervals. The complementary output of B–2 or line B–2($\overline{x}$) is at zero during the 2 and 3 intervals and is at a voltage condition during the 0 and 1 intervals. The outputs from B–1 and B–2 provide the timing signals for the system when they are combined, differentiated or inverted as herein described.

The output from D–2 is the differential of the rise part of the B–2(x) signal and is a pulse that occurs at the beginning of each 2 interval; the output from A–1 is the combination of B–1(x) and B–2($\bar{x}$) and is a binary signal that occupies the 3 interval; the output from A–2 is the combination of B–1(x) and B–2(x) and is a binary signal that occupies the 1 interval; and the output from D–3 is a series of pulses that occur at the beginning of each 1 and each 3 interval. These outputs are represented on the appropriately titled lines in FIG. 2. Further, the outputs from A–1, A–2, D–1, and D–2 are connected to the primary sampling section 15 and the outputs from I–1 and D–3 are connected to the secondary sampling section 17 as hereinafter described.

The primary sampling section 15 comprises a third two input AND gate 37, a fourth two input AND gate 39, a second inverter 41, a first flip-flop 43, a second flip-flop 45, and a first exclusive OR gate 47. The third and fourth AND gates are designated as A–3 and A–4, respectively; the second inverter is designated as I–2; the first and second flip-flops are designated as FF–1 and FF–2, respectively; and the first exclusive OR gate is designated as EOR–1 in FIG. 1. Only the true (X) outputs of FF–1 and FF–2 are used.

The output from D–1 of the timing section is connected to one input of A–3; similarly, the output from D–2 is connected to one input of A–4. The input 65 to the system from the external signal source is connected through a clipper 49 to the second input of A–3 and to the input of I–2. The output from I–2 is connected to the second input of A–4. The output from A–3 is connected to the set input of FF–1 and the output from A–1 of the timing section is connected to the reset input of FF–1. Similarly, the output from A–4 is connected to the set input of FF–2 and the output of A–2 of the timing section is connected to the reset input of FF–2. The true outputs of FF–1 and FF–2 are connected to the inputs of EOR–1.

The secondary sampling section comprises a fifth two input AND gate 51, a sixth two input AND gate 53, a seventh AND gate 55, an eighth AND gate 57, a third inverter 59, a third flip-flop 61, and a second exclusive OR gate 63. The seventh and eighth AND gates are three input AND gates. The fifth, sixth, seventh, and eighth AND gates are designated as A–5, A–6, A–7, and A–8, respectively; the third inverter is designated as I–3; the third flip-flop is designated as FF–3; and the second exclusive OR gate is designated as EOR–2 in FIG. 1. Only the true (x) output of FF–3 is used.

The signal from the clipper 49 and the output from D–3 of the timing section are connected to the two inputs of A–5; the output from I–2 of the primary sampling section and the output from D–3 of the timing section are connected to the two inputs of A–6. The output from A–5 is connected to the set input of FF–3; and the output from A–6 is connected to the reset input of FF–3. The true output from FF–3 is connected to one input of EOR–2 and the output from FF–1 is connected to the second input of EOR–2. The outputs from EOR–1, EOR–2, and I–1 are connected to the three inputs of A–7. The output from EOR–2 is also connected to the input of I–3. The output from I–3, EOR–1, and I–1 are connected to the three inputs of A–8. The outputs from A–7 and A–8 are the "increase" and "decrease" frequency pulse outputs and are connected to the voltage controlled oscillator 11.

Generally, the system operates so that the primary sample section samples the signal passed by the clipper once every half-cycle of the output signal as indicated at the output terminal 67. In between these samplings the secondary sample section samples the signal passed by the clipper. This can be seen from lines D–1, D–2, and D–3 of FIG. 2. Lines D–1 and D–2 represent the outputs from the differentiators of the timing section connected to the primary sampling section 15. These outputs occur alternately, one output occurring during each four interval cycle of the system's operation. Hence, the combined outputs of D–1 and D–2 create signals that occur once each half-cycle. D–3 provides sampling signals that occur in between the D–1, D–2 signals; hence, D–3 controls the secondary sampling so that a secondary sample is taken between each primary sample.

In accordance with the theory of operation of the system, the primary samples are taken during the 0 and 2 intervals. Because the second primary sample is taken of an inverted external signal, the outputs from FF–1 and FF–2 are the same during the sampling intervals if the frequency of the signal at the input 65 is the same as the frequency of the output signal at the output terminal 67. Specifically, they could be at either a voltage condition or at a zero condition but in either case they are the same. Because they are the same there is no output from EOR–1 during the 0 and 2 intervals. However, if the frequency of the input signal and the output signal are different then the outputs from FF–1 and FF–2 are different during some of the 0 and 2 intervals. Specifically, one is at a zero condition and the other is at a voltage condition. When these differences occur there is an output from EOR–1. It should be noted that the primary sampling section does not determine whether the frequency of the input signal is above or below the frequency of the output signal, it only determines that there is a difference. The secondary sampling section determines whether the input signal is above or below the output signal.

The secondary sampling occurs during the 1 and 3 intervals. It is compared with the output of FF–1 to determine if the frequency of the incoming signal is above or below the frequency of the output signal. Specifically, the secondary sample pulses control a pair of AND gates connected separately to the incoming signal and an inverted incoming signal. The outputs of the AND gates are separately connected to the set and reset sides of a third flip-flop during the sampling intervals. The output of the third flip-flop is compared with the output of the first flip-flop in EOR–2. The output from EOR–2 during the 0 and 2 intervals indicates whether the frequency of the incoming signal is above or below the frequency of the output signal.

To more fully understand the operation of the invention the following discussion of various frequency relationships between the incoming signal and the output signal is presented. FIGS. 3, 4, 5, and 6 are timing diagrams for the appropriate portions of the primary and secondary sampling sections.

Figure 3:
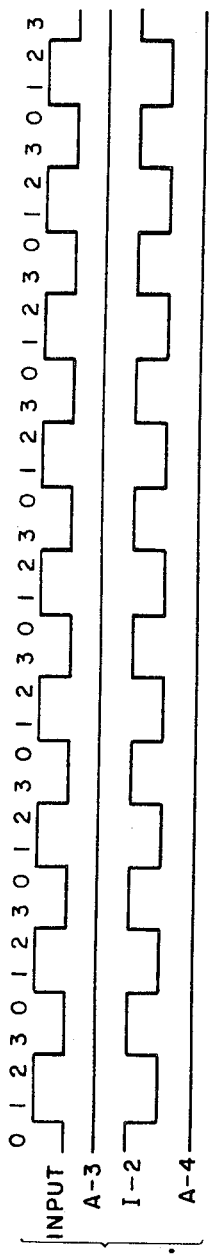
FIG. 3 is a timing diagram for the primary sampling section of the embodiment of the invention illustrated in FIG. 1 when the external signal is at the same frequency as the internal signal but 90° out of phase therewith.

FIG. 3 is a timing diagram illustrating that there is no output from the primary sampling section when the input signal is at the same frequency as the signal from the output but 90° out of phase therewith. Specifically, this input signal is represented as the input line; it is at the same frequency as the output. That is, it goes through a complete cycle in exactly four intervals. There is no output from A–3 because at no time does the primary sampling signal from D–1 coincide with the input signal. That is, the sampling signal D–1 occurs at the beginning of the 0 interval; however, the input signal is only positive during the 1 and 2 intervals. Hence, there is no output from A–3 and FF–1 is never set. Moreover, there is no output from A–4 because there is no coincidence between its inputs from D–2 and I–1. The D–2 timing pulse occurs at the beginning of the 2 interval whereas the I–1 output occurs during the 0 and 3 intervals (i.e., it is the inversion of the input signal). Hence, FF–2 is never set. Therefore, there is no time interval during which there are opposite signals from FF–1 and FF–2.

Because there is no time interval during which the outputs from FF–1 and FF–2 are different there is never an output from EOR–1. EOR–1 is connected to the three input AND gates, hence, EOR–1 prevents any output from passing through those gates. Moreover, even if the secondary sampling section generates an output, EOR–1 prevents their being applied to the VCO. It will be appreciated that under this condition of frequency synchronism the VCO does not receive pulses telling to change frequency.

Figure 4:
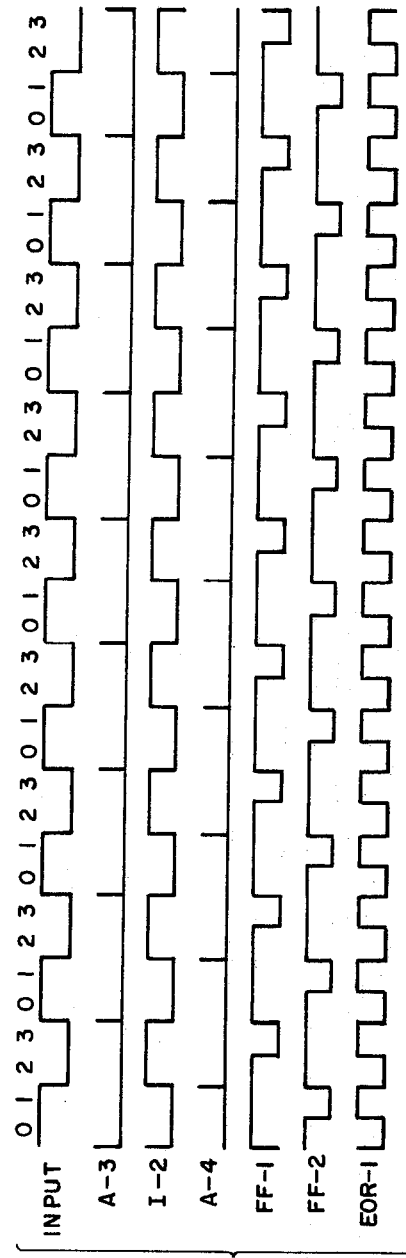
FIG. 4 is a timing diagram of the primary sampling section for the embodiment of the invention illustrated in FIG. 1 when the external signal is at the frequency of the internal signal but shifted in phase 180°.

FIG. 4 is a timing diagram representing the condition wherein the input signal is at the same frequency as the output signal but 180° out of phase therewith.

The input signal illustrated in FIG. 4 is at a voltage condition during the 0 and 1 intervals and at zero during the 2 and 3 intervals; therefore, there is a voltage coincidence between the D-1 sampling pulse (FIG. 2) and the input signal. This coincidence occurs at the beginning of each 0 interval and provides an output pulse from A-3 at that interval. The output from I-2 is the inversion of the input signal and is at a voltage condition during the 2 and 3 intervals and at zero during the 0 and 1 intervals. Hence, there is also voltage coincidence between the timing pulses from D-2 and the signal from I-2. This coincidence provides an output pulse from A-4 at the beginning of each 2 interval. The pulses from A-3 and A-4 set FF-1 and FF-2, respectively. The output from FF-1 is on for the 0, 1, and 2 intervals and is triggered off during the 3 interval by the output from A-1. The output from FF-2 is on during the 2, 3, and 0 intervals and is triggered off during the 1 interval by A-2. The outputs from FF-1 and FF-2 are applied to EOR-1.

Because EOR-1 only generates an output when there is a difference between its input signals, it generates a zero signal during the 0 and 2 intervals and a voltage signal during the 1 and 3 intervals. This is represented as line EOR-1 in FIG. 4. Noting from FIG. 2 that because the output from I-1 is zero during the 0 and 2 intervals; and that because the outputs from I-1 and EOR-1 are connected to the inputs of A-7 and A-8; it is apparent that A-7 and A-8 never have outputs. Specifically, there is a zero signal applied to A-7 and A-8 during all of the four intervals. Hence, regardless of the output of EOR-2, A-7 and A-8 do not have outputs. Therefore, even though there is a 180° phase shift between the frequency of the input signal and the frequency of the output signal they are at the same frequency and because they are at the same frequency there are no pulses applied by A-7 and A-8 to the VCO to change its output frequency.

It will be appreciated from the foregoing that when there is frequency synchronism between the input signal and the output signal there will be no outputs from A-7 or A-8 to cause a frequency change in the output from the VCO. This conclusion is true even if there is a phase difference between the two signals. However, as hereinafter described with respect to FIGS. 5 and 6 when there is a frequency difference between the input signal and the output signal a pulse is applied by either A-7 or A-8 (depending upon whether the frequency is above or below the output signal) to change the frequency of the signal output from the VCO.

Figure 5:
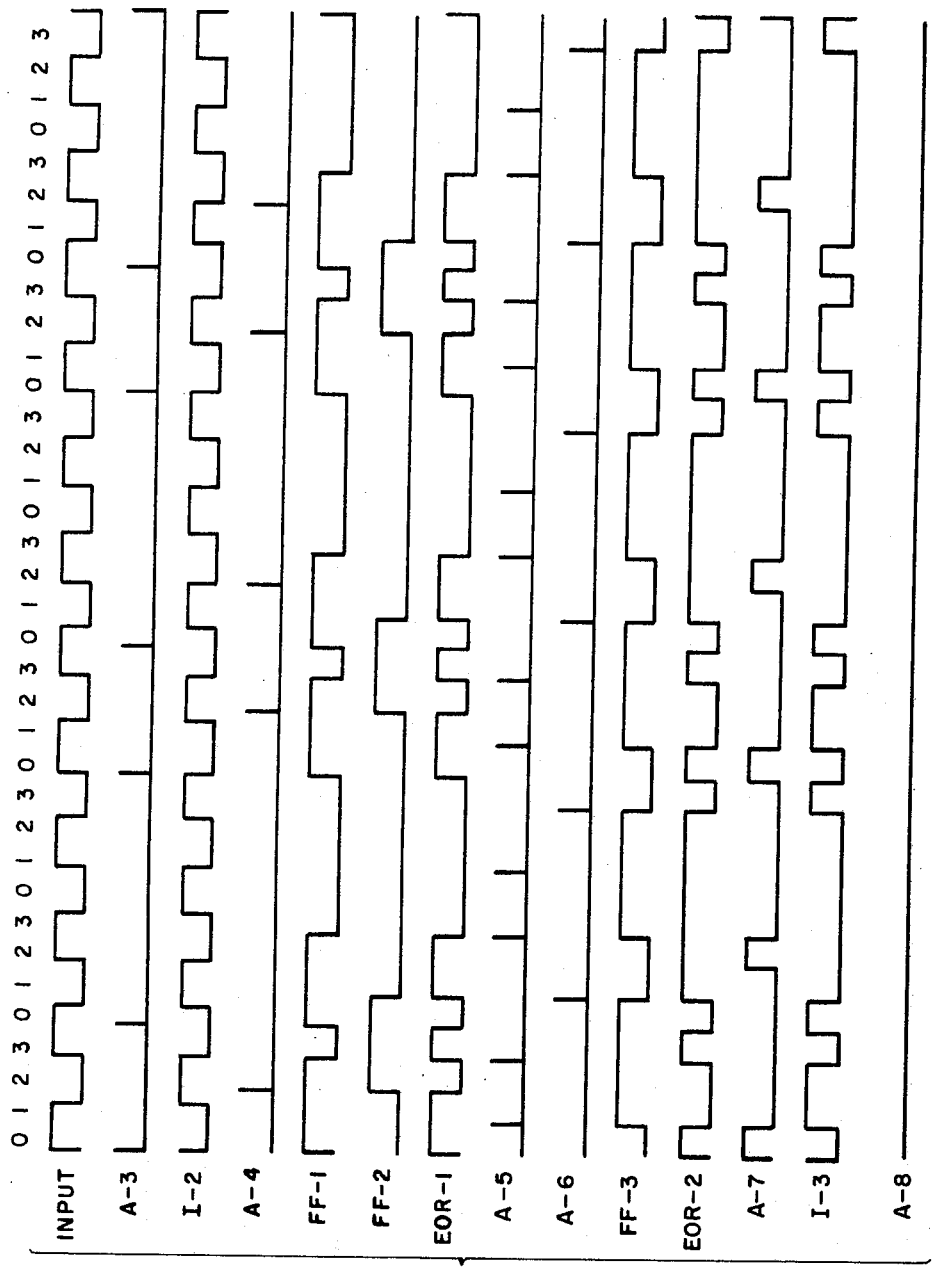
FIG. 5 is a timing diagram of the primary and secondary sampling sections of the invention as illustrated in FIG. 1 when the frequency of the external signal is above the frequency of internal signal.

FIG. 5 represents the condition wherein the input signal frequency is greater than the frequency of the output signal. By way of example, the period of the input signal illustrated in FIG. 5 is three-fourths of the period of the output signal. Coincidence occurs between the output from D-1 and the input signal during certain intervals best represented by line A-3 of FIG. 5. Further, the output from I-2 and the sampling pulses from D-2 provide coincidence during certain periods as represented by line A-4 of FIG. 5. A-3 triggers FF-1 to give an output signal represented by line FF-1 and A-4 triggers FF-2 to give an output signal represented by line FF-2. These signals are combined in EOR-1 and generate an output signal represented by line EOR-1. It will be appreciated from the discussion of FIG. 4 that an output from EOR-1 only passes through A-7 or A-8 if a signal exists during the time the output from I-2 exists (intervals 0 and 2). In addition, there must be an output from either EOR-2 or I-3 before A-7 or A-8 pass output pulses. Viewing line EOR-1 of FIG. 5 it will be appreciated that at various times signals exist from EOR-1 during the 0 and 2 intervals.

Because outputs from EOR-1 exist during the 0 and 2 intervals they indicate that there is a frequency difference, hence, it is necessary to analyze the secondary sampling section to determine if it generates an output signal to pass through either gate A-7 or gate A-8. A-5 combines pulses from D-3 and the input signal to generate the signal illustrated as line A-5 of FIG. 5. A-6 combines pulses from D-3 and I-2 to generate the output signal illustrated as line A-6 of FIG. 5. The output from A-5 sets FF-3 and the output from A-6 resets FF-3 to cause the output signal from FF-3 illustrated as line FF-3 of FIG. 5. This output is compared with the output from F-1 in EOR-2 to generate the line EOR-2 signal. The outputs from EOR-2, EOR-1 and I-1 are compared in A-7 to generate a series of pulses as represented by line A-7 of FIG. 5. These pulses are applied to the VCO. In addition, FIG. 5 illustrates that the output from I-3 applied to A-8 is never coincident with the output signals from I-1 and EOR-1 also applied to A-8. Hence, A-8 never generates an output signal. In conclusion, the pulse output from A-7 tells the VCO that the output frequency is below that of the frequency of the input signal. Hence, the frequency of the output from the VCO can be increased by any suitable electronic means such as integrating the pulses from A-7, for example. It will continue to be increased until the desired frequency coincident condition occurs. At this condition the output signal will be at the same frequency as the incoming signal and no further pulses will be passed by A-7. This is the condition illustrated with respect to FIGS. 2, 3, and 4 and discussed above.

Figure 6:
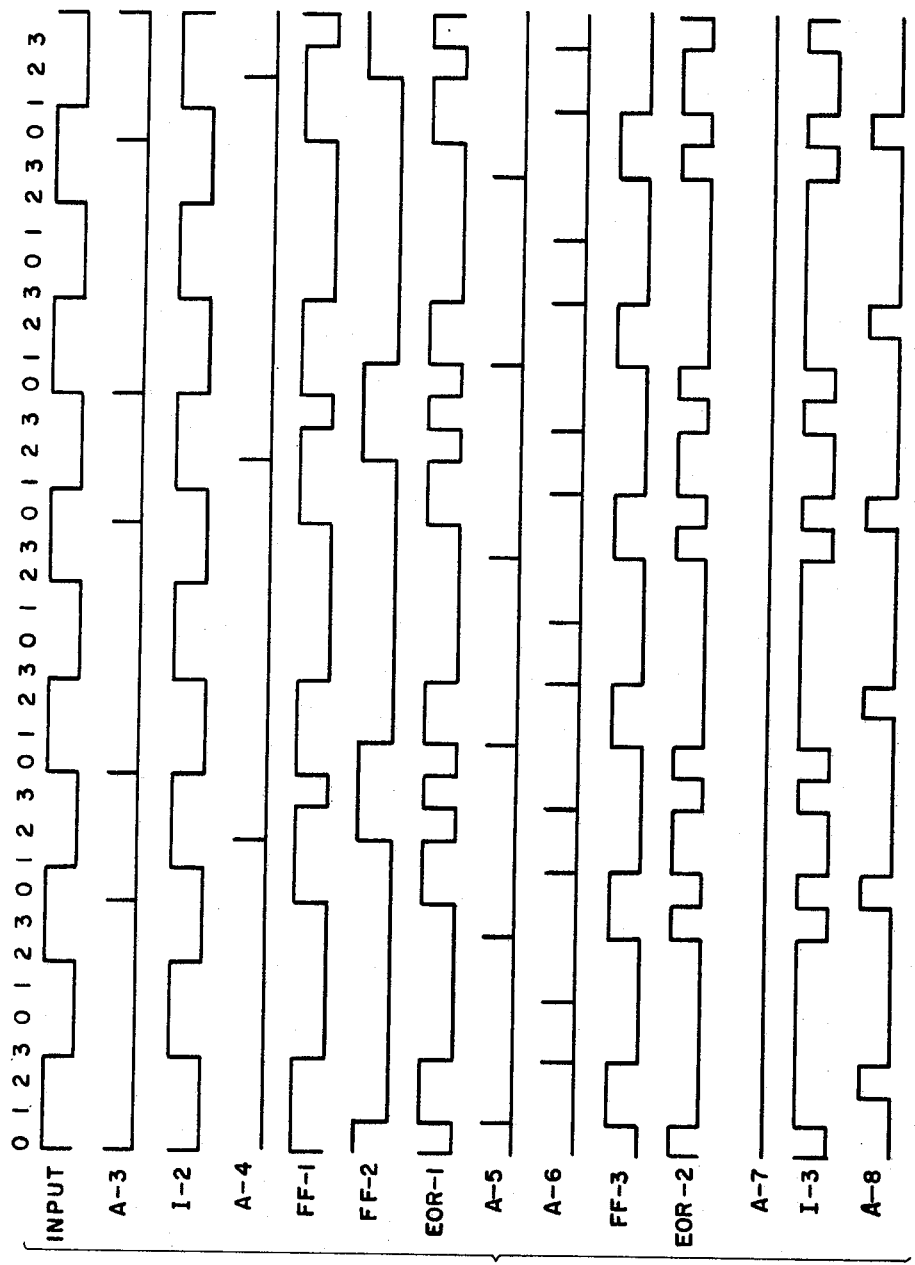
FIG. 6 is a timing diagram of the primary and secondary sampling sections of the invention when the frequency of the external signal is below the frequency of the internal signal.

FIG. 6 is a timing chart for the condition where the frequency of the input signal is below the frequency of the output signal. For ease of illustration the period of the input signal illustrated in FIG. 6 is equal to 1½ periods of the output signal. The comparison in A-3 between the input signal and the timing signal from D-1 causes a signal of the type illustrated on line A-3. Similarly, a comparison in A-4 of the output from I-2 and the timing pulses from D-2 causes a signal of the type illustrated on line A-4 of FIG. 6. As discussed above these signals set FF-1 and FF-2 which are reset by A-1 and A-2, respectively. The outputs from the flip-flops are illustrated on lines FF-1 and FF-2 of FIG. 6. These output signals are compared in EOR-1 to cause an output signal from EOR-1 of the type illustrated on line EOR-1 of FIG. 6. It is to be noted that an output from EOR-1 occurs during some of the 0 and 2 intervals. Hence, it applies a signal to A-7 and A-8 during the 0 and 2 intervals to indicate that there is an out of frequency condition occurring.

The output from A-5 is a combination of the D-3 signal and the input signal and is illustrated on line A-5. The output from A-6 is a combination of the D-3 and the I-2 signals as is illustrated on line A-6 of FIG. 6. These gates set and reset FF-3 to generate an output illustrated by line FF-3 of FIG. 6. The output from FF-3 is combined with the output from FF-1 in EOR-2 to generate the output signal EOR-2 of FIG. 6. The output from EOR-2 is inverted in I-3. When the outputs from EOR-2, EOR-1, and I-1 are AND gated in A-7 no output signal occurs. However, when the output from I-3 is AND gated with the I-1 and EOR-1 outputs in gate A-8 an output signal of the type represented by line A-8 occurs. This output signal is applied to the VCO to tell it to decrease the output frequency so that it will coincide with the input frequency.

Therefore, the output from A-7 tells the VCO to increase its frequency to cause synchronism, and the output from A-8 tells the VCO to decrease its frequency to cause synchronism. In this manner the VCO is informed when the output signal is out of frequency with the input signal and whether the output signal frequency is above or below the frequency of the input signal.

It will be appreciated that the foregoing has described a simple system for detecting when an internally generated signal (that generated by the VCO and counted down by B-1 and B-2) is out of frequency coincidence with an external signal (the input signal) and for providing pulses which can be utilized by the internal signal generating means to cause it to increase or decrease its output frequency as desired.

Figure 7:
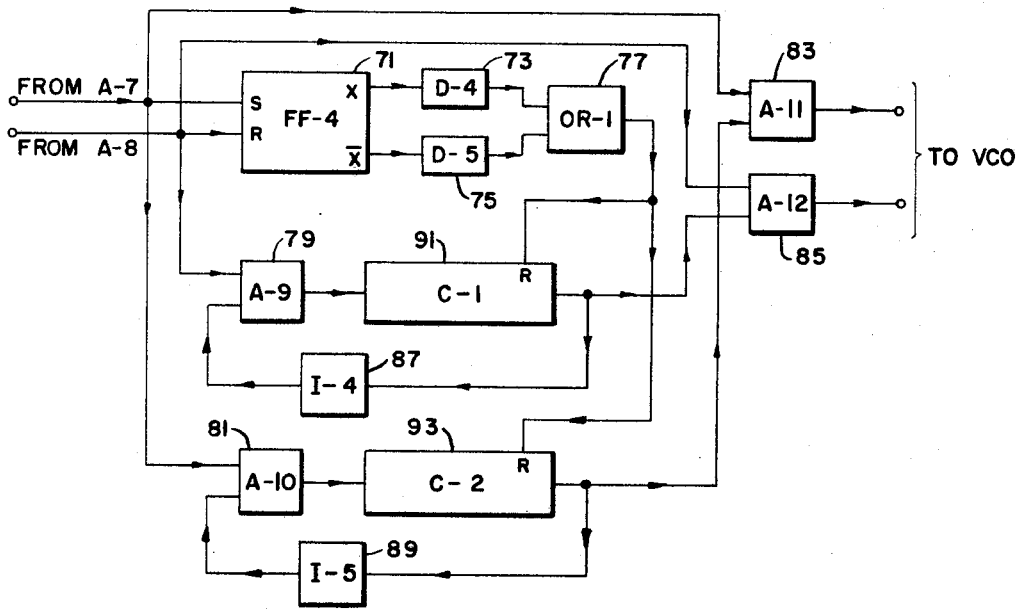
FIG. 7 is a block diagram of a system for preventing noise from introducing errors into the embodiment illustrated in FIG. 1.

While the embodiment of the invention illustrated in FIG. 1 operates satisfactorily for a clear input signal, it will not operate as satisfactorily as desirable if the input signal is low level and mixed with noise. Specifically, the noise causes alternate outputs from A-7 and A-8; these outputs are false outputs and cause the system to hunt thereby preventing the correct operation of the system. FIG. 7 illustrates, in block diagram form, an apparatus for preventing noise from inhibiting the correct operation of the invention.

FIG. 7 comprises a fourth flip-flop 71, a fourth differentiator 73, a fifth differentiator 75, a first two input OR gate 77, a ninth two input AND gate 79, a tenth two input AND gate 81, an eleventh two input AND gate 83, a twelfth two input AND gate 85, a fourth inverter 87, a fifth inverter 89, a first counter 91 and a second counter 93. The fourth flip-flop is illustrated as FF-4; the fourth and fifth differentiators are illustrated as D-4 and D-5, respectively; the first OR gate is illustrated as OR-1; the ninth, tenth, eleventh and twelfth AND gates are illustrated as A-9, A-10, A-11, and A-12, respectively; the fourth and fifth inverters are illustrated as I-4 and I-5, respectively; and the first and second counters are illustrated as C-1 and C-2, respectively.

The system illustrated in FIG. 7 is adapted to be connected between the outputs of A-7 and A-8 and the VCO. The set input of FF-4, one input of A-10, and one input of A-11 are connected to the output of A-7. The reset input of FF-4, one input of A-9, and one input of A-10 are connected to the output of A-8. The true (X) output of FF-4 is connected to the input of D-4 and the false ($\overline{X}$) output of FF-4 is connected to the input of D-5. The outputs of D-4 and D-5 are connected to the dual inputs of OR-1.

The output of A-9 is connected to the signal input of C-1. Similarly, the output of A-10 is connected to the signal input of C-2. The output of OR-1 is connected to the reset inputs of C-1 and C-2. The output of C-1 is connected to the second input of A-12 and through I-4 to the second input of A-9. The output of C-2 is connected to the second input of A-11 and through I-5 to the second input of A-10. The outputs of A-11 and A-12 are adapted for connection to the VCO as substitutes for A-7 and A-8, respectively.

The apparatus illustrated in FIG. 7 is designed to accumulate the pulses from A-7 and A-8 to determine if a signal is being received at the input terminal 65 or if only noise is being received at the input terminal. Specifically, assuming the counters C-1 and C-2 are eight stage counters, eight input pulses from A-7 or A-8 without a pulse from the other gate must occur before an output from A-11 or A-12 occurs. More specifically, if A-7 is passing pulses, its first pulse sets FF-4 and resets C-1 and C-2 by the X output of FF-4 passing through D-4 and OR-1. This first pulse will not pass through A-11 because A-11 does not have a second input, i.e., it is inhibited. The second input pulse maintains FF-4 set and passes into the first stage of C-2. The second pulse does not pass through A-11 because the second input (which is the last stage output of C-2) still inhibits A-11. It should be noted that A-10 is not inhibited by the output of C-2, because I-5 inverts the C-2 output applied to it, i.e. it gates A-10 "on."

Eight pulses from A-7 are accumulated in C-2 before a pulse passes through A-11 because at that point the output from C-2 gates A-11 "on." The output from C-2 at this point also inhibits A-10 to prevent any more pulses from being applied to C-2. Thereafter any more pulses from A-7 are passed through A-11 and applied to the VCO in the manner hereinbefore described. Similarly, if A-8 is passing pulses they operate to fill C-1.

However, if during the reception of the eight A-7 pulses one A-8 pulse had been received no A-7 pulses would have passed through A-11. That is, an A-8 pulse resets FF-4. Resetting FF-4 generates an $\overline{X}$ output pulse that passes through D-5 and OR-1 to the reset inputs of C-1 and C-2. Hence, one A-8 pulse resets C-2 and, before A-7 pulses can pass through A-11, eight more A-7 pulses must arrive to fill C-2. In this manner the system illustrated in FIG. 7 determines whether there is an actual signal at input 65 or whether its input is just noise. That is, because noise is random FF-4 would be constantly receiving pulses from A-7 and A-8. These pulses would set and reset FF-4 to provide reset pulses to C-1 and C-2 and prevent them from accumulating eight pulses.

It should be noted that an eight stage C-1 and C-2 counter is only by way of example and that any number of stages could be used. It is only necessary that the number of stages be sufficient to prevent noise from causing the generation of erroneous pulses.

Figure 8:
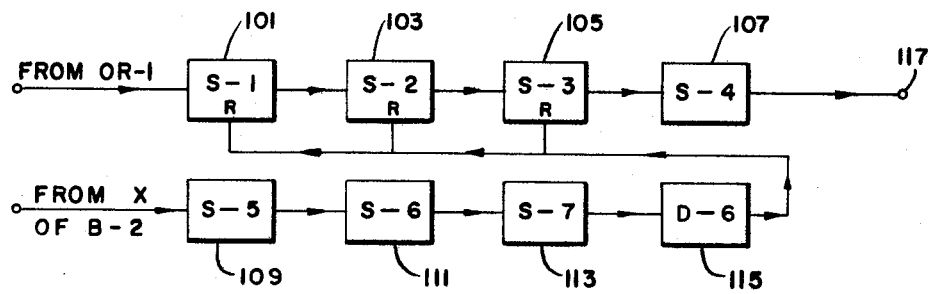
FIG. 8 is a block diagram of a system for use with the embodiment illustrated in FIG. 1 to provide a switching pulse if a signal is not present at the input.

In some situations it is desirable to use the invention to determine which line of a plurality of lines contains a signal. FIG. 8 illustrates additional elements that, when added to FIGS. 1 and 7, accomplish this result. Specifically the FIG. 8 system provides an automatic switching pulse when a signal is not on the line connected to the input terminal 65 of FIG. 1.

The system illustrated in FIG. 8 comprises seven binary stages 101, 103, 105, 107, 109, and 111, and a differentiator 115. The seven stages are illustrated as S-1, S-2, S-3, S-4, S-5, S-6, and S-7, respectively, and the differentiator is illustrated as D-6. The input to S-1 is adapted to be connected to the output of OR-1 of FIG. 7. S-1, S-2, S-3, and S-4 are connected in series and the output of S-4 is connected to an output terminal 117. S-5, S-6, and S-7 are also connected in series. The input to S-5 is adapted for connection to the X output of B-2 of FIG. 1. The output of S-7 is connected through D-6 to the reset inputs of S-1, S-2, and S-3.

The system illustrated in FIG. 8 is designed to provide a race between the pulse outputs of OR-1 and B-2. If the pulses from OR-1 reach the output terminal 117 before the pulses from B-2 reach D-6 and the reset terminals of S-1, S-2, and S-3 then noise is on the input—not a signal. Vice versa indicates a signal. Specifically, random noise will cause FF-4 to flip back and forth in a rapid manner, much more rapidly than the rate of pulses from B-2, hence these pulses will reach the output terminal prior to S-1, S-2, and S-3 being reset by pulses from B-2. However, if a signal is at the input terminal 65 then FF-4 will either never switch its output or it will only do so over a long period of time. In this case the B-2 pulses will reset S-1, S-2, and S-3 before a pulse reaches terminal 117.

Pulses at terminal 117 can be coupled to an automatic switching means (not shown) to switch the input from one line to another to determine which line carries a signal. Obviously, means must be provided to reset S-1 through S-7 every time line switching occurs; this may be done in any convenient, well known manner.

While the hereinabove described invention has found large use in the tracking of incoming data signals it will be appreciated that it has use in other environments. For example, a system for determining whether an internally generated signal is at the frequency of an externally generated signal can be utilized in a device for determining the frequency of an externally generated signal by coupling the systems to adequate meters or frequency indicating devices. Further, as described with respect to FIG. 8 a system of this nature can be sequentially connected to a plurality of signal lines to determine whether a signal exists or does not exist on any individual line. Then, the system can be used to determine the frequency of the signal. Hence, the invention can be practiced otherwise than as specifically described herein.

What is claimed is:

1. Apparatus of the type described comprising:
   timing means connected to the output of a signal generating device for generating primary and secondary sets of timing signals;
   primary sampling means connected to said timing means to receive the primary timing signals from said timing means for sampling external signals at predetermined intervals to determine if an external signal is out of synchronism with said signal from said signal generating device; and
   secondary sampling means connected to said timing means to receive the secondary timing signals from said timing means for sampling said external signal at predetermined intervals to determine whether said external signal is above or below the frequency of the signal generated by said signal generating device.

2. Apparatus as claimed in claim 1 wherein said timing means includes:
   binary counting means connected to the output of said signal generating device for counting down the output frequency from said signal generating device to generate signals at one-half and one-fourth the frequency of the output of said signal generating device.

3. Apparatus as claimed in 2 wherein said binary counting means includes first and second countdown binary counters and wherein said timing means also includes:
   first and second two input AND gates;
   first, second, and third differentiator circuits;
   a first inverter;
   the output of said signal generating device connected to the input of said first binary counter;
   the true output of said first binary counter connected to the input of said second binary counter, one input of said first AND gate, one input of said second AND gate, the input of said third differentiator, and the input of said first inverter;
   the true output of said second binary counter connected to the second input of said first AND gate and the input of said second differentiator; and
   the complementary output of said second binary connected to the second input of said second AND gate and to the input of said first differentiator.

4. Apparatus as claimed in claim 3 wherein said primary sampling means comprises:
   third and fourth two input AND gates;
   a second inverter;
   first and second flip-flops;
   first two input exclusive OR gate;
   the input to said second inverter and one input of said third AND gate adapted to receive said external signal;
   the output from said first differentiator connected to the second input of said third AND gate;
   the output from said second inverter connected to one input of said fourth AND gate;
   the output from said second differentiator connected to the second input of said fourth AND gate;
   the output from said third AND gate connected to the set input of said first flip-flop and the output from said fourth AND gate connected to the set input of said second flip-flop;
   the output from said first AND gate connected to the reset input of said first flip-flop and the output from said second AND gate connected to the reset input of said second flip-flop; and
   the outputs from said first and second flip-flops connected to the two inputs of said first exclusive OR gate.

5. Apparatus as claimed in claim 4 wherein said secondary sampling means comprises:
   fifth and sixth two input AND gates and seventh and eighth three input AND gates;
   a third inverter;
   a third flip-flop;
   a second two input exclusive OR gate;
   the output from said third differentiator connected to one input of said fifth and sixth AND gates;
   the second input to said fifth AND gate adapted to receive said external signal and the second input to said sixth AND gate connected to the output of said second inverter;
   the output from said fifth AND gate connected to the set input of said third flip-flop and the output from said sixth AND gate connected to the reset input of said third flip-flop;
   the output from said third flip-flop and the output from said first flip-flop connected to the two inputs of said second exclusive OR gate;
   the output from said first exclusive OR gate connected to one input of each of the seventh and eighth AND gates;
   the output from said second exclusive OR gate connected to one input of the seventh AND gate and to the input of the third inverter;
   the output from said third inverter connected to the second input of the eighth AND gate;
   the output from said first inverter connected to the third input of said seventh and eighth AND gates; and
   the outputs from said seventh and eighth AND gates adapted for connection to said signal generating device.

6. Apparatus as claimed in claim 5 including:
   an input terminal;
   a clipper circuit; and
   said clipper connected between said input terminal and said third AND gate, said fifth AND gate, and said second inverter.

7. Apparatus as claimed in claim 6 including a voltage controlled oscillator as said signal generating device.

8. Apparatus as claimed in claim 1 wherein:
   said secondary sampling means generates pulses indicative of frequency differences between the output of said signal generating device and said external signal; and
   including control means in circuit between said sampling means and said signal generating device for controlling the frequency thereof in response to said pulses.

9. Apparatus as claimed in claim 8 wherein said control means includes:
   pulse accumulating means for applying control signals to said signal generating device.

10. Apparatus as claimed in claim 9 and wherein said pulse accumulting means includes:
    counting means and inhibit means operable to apply control signals to said signal generating means only in response to the accumulation of a predetermined number of successive pulses.

11. Apparatus as claimed in claim 10 and further including:
    selections means responsive to said secondary sampling means operable to select an external signal having a periodic component.

12. Apparatus as claimed in claim 11 wherein said selection means includes:
    a fourth flip-flop;
    fourth and fifth differentiators;
    a first two input OR gate;
    ninth, tenth, eleventh, and twelfth two input AND gates;
    fourth and fifth inverters;
    first and second counters;
    the output of said seventh AND gate connected to the set input of said fourth flip-flop to one input of said tenth AND gate, and to one input of said eleventh AND gate;

the output of said eighth AND gate connected to the reset input of said fourth flip-flop, to one input of the ninth AND gate, and to one input of the twelfth AND gate;

the true output of said fourth flip-flop connected through said fourth differentiator to one input of said first OR gate and the complementary output of said fourth flip-flop connected through said fifth differentiator to the second input of said first OR gate;

the output of said first OR gate conneted to the reset inputs of said first and second counters;

the output of said first counter connected to the second input of said twelfth AND gate and through said fourth inverter to the second input of said ninth AND gate;

the output of said second counter connected to the second input of said eleventh AND gate and through said fifth inverter to the second input of said tenth AND gate;

the output of said ninth AND gate connected to the input of said first counter; and the output of said tenth AND gate connected to the input of said second counter.

13. Apparatus as claimed in claim 12 including:

seven binary counter stages;

a sixth differentiator;

an output terminal;

said first, second, third and fourth binary counter stages connected in series between the output of said first OR gate and said output terminal;

said fifth, sixth and seventh binary counter stages connected in series between the output true output of said first countdown binary counter and the input of said sixth differentiator; and the output of said sixth differentiator connected to the reset input of said first, second, and third binary counter stages.

No references cited.

JOHN KOMINSKI, *Primary Examiner.*

ROY LAKE, *Examiner.*